(12) United States Patent
Hu et al.

(10) Patent No.: US 11,692,891 B2
(45) Date of Patent: Jul. 4, 2023

(54) APPARATUS AND METHOD FOR TESTING PRESSURE CHANGE RATE OF COMPONENT IN ELECTRO-PNEUMATIC BRAKING SYSTEM OF COMMERCIAL VEHICLE

(71) Applicant: Wuhan University Of Technology, Wuhan (CN)

(72) Inventors: Jian Hu, Wuhan (CN); Yi Cheng, Wuhan (CN); Hanwei Bao, Wuhan (CN); Fang Yang, Wuhan (CN); Gangyan Li, Wuhan (CN)

(73) Assignee: Wuhan University Of Technology, Wuhan (CN)

( * ) Notice: Subject to any disclaimer, the term of this patent is extended or adjusted under 35 U.S.C. 154(b) by 0 days.

(21) Appl. No.: 17/725,533

(22) Filed: Apr. 20, 2022

(65) Prior Publication Data
US 2022/0244121 A1  Aug. 4, 2022

Related U.S. Application Data

(63) Continuation of application No. PCT/CN2021/101970, filed on Jun. 24, 2021.

(30) Foreign Application Priority Data

Jul. 21, 2020 (CN) .......................... 202010703475.2

(51) Int. Cl.
*G01L 5/28* (2006.01)
*B60T 17/22* (2006.01)
(Continued)

(52) U.S. Cl.
CPC .............. *G01L 5/28* (2013.01); *B60T 17/221* (2013.01); *G01L 11/00* (2013.01);
(Continued)

(58) Field of Classification Search
CPC .......... B60T 17/221; G01L 5/28; G01L 11/00; G01M 3/2815; G01M 3/2876; G01M 17/007
See application file for complete search history.

(56) References Cited

U.S. PATENT DOCUMENTS 5,936,153 A * 8/1999 Steckler ................ G01M 17/08
73/39
6,754,568 B1   6/2004 Ripley
(Continued)

*Primary Examiner* — Eric S. McCall
(74) *Attorney, Agent, or Firm* — True Shepherd LLC; Andrew C. Cheng

(57) ABSTRACT

An apparatus for testing a pressure change rate of a component in an electro-pneumatic braking system of a commercial vehicle includes a pressure change rate test bench, a pneumatic loop configured to implement on-off control of air and detection on a pressure change rate of a tested component in an electro-pneumatic braking system of a commercial vehicle, a signal processing unit configured to acquire a pressure signal and a differential pressure signal and perform analog-digital conversion on the signals to provide signals recognizable by an upper controller and a lower execution component, and a control unit configured to communicate with the pneumatic loop and drive the components in the pneumatic loop to act by setting a control parameter to obtain test data of the tested component in the electro-pneumatic braking system of the commercial vehicle in the pneumatic loop.

10 Claims, 4 Drawing Sheets

(51) Int. Cl.
*G01L 11/00* (2006.01)
*G01M 3/28* (2006.01)
*G01M 17/007* (2006.01)

(52) U.S. Cl.
CPC ........ *G01M 3/2815* (2013.01); *G01M 3/2876* (2013.01); *G01M 17/007* (2013.01)

(56) References Cited

U.S. PATENT DOCUMENTS

| | | |
|---|---|---|
| 10,549,739 B2 | 2/2020 | Kasper et al. |
| 10,676,073 B2 | 6/2020 | Gomes |
| 2017/0328812 A1* | 11/2017 | Zhang ................. G01M 17/007 |
| 2017/0336279 A1* | 11/2017 | Schmid .................... G01L 5/28 |
| 2022/0196513 A1* | 6/2022 | Li ........................ G01M 13/003 |
| 2023/0015629 A1* | 1/2023 | Li ............................ B60T 15/18 |

* cited by examiner

APPARATUS AND METHOD FOR TESTING PRESSURE CHANGE RATE OF COMPONENT IN ELECTRO-PNEUMATIC BRAKING SYSTEM OF COMMERCIAL VEHICLE

CROSS-REFERENCE TO RELATED APPLICATIONS

This application is a continuation of International Patent Application No. PCT/CN2021/101970 with a filing date of Jun. 24, 2021, designating the United States, now pending, and further claims priority to Chinese Patent Application No. 202010703475.2 with a filing date of Jul. 21, 2020. The content of the aforementioned applications, including any intervening amendments thereto, are incorporated herein by reference.

TECHNICAL FIELD

The present disclosure relates to the technical field of automobile braking, and in particular, to an apparatus and method for testing a pressure change rate of a component in an electro-pneumatic braking system of a commercial vehicle.

BACKGROUND ART

The active safety, stability and ride comfort of a commercial vehicle have become major concerns in the road transportation industry. An air braking system is a core module that determines the braking performance of a commercial vehicle and also one of the most important parts for avoiding a traffic accident. In recent years, great development has been made in electronic braking system (EBS) for commercial vehicles. Commercial vehicles have been gradually equipped with the EBS. The EBS enhances the safety of a vehicle and improves the braking performance. An integrated braking system may reduce the operation cost.

With the development of the modern automobile technologies such as aided driving and automatic driving, the active braking technology has to be able to adaptively meet specific braking expectations under different working conditions, and this process will be gradually independent of the active intervention of a driver. The active braking technology allows for fewer operations of a driver during braking and realizes accurate and intelligent control. With the decrease in manufacturing cost and the development of the control technology, the active braking technology has become the inexorable trend of automobile braking development. Accordingly, an urgent key technical problem to be solved in an electro-pneumatic braking system is how to accurately meet braking expectations.

For an electro-pneumatic braking system of a commercial vehicle that is capable of active braking, even though the braking pressure reaches a desired pressure value, advance or lag of the response time may still occur. In addition, due to lack of a driver's intervention, there may still be safety or stability problems. In active braking environment, an ideal braking expectation is that the desired braking pressure is created at a desired time. In other words, both of pressure response and time response among the dynamic characteristics of the electro-pneumatic braking system should be taken into account, thereby reducing a pressure deviation and a time deviation. To guarantee safe and stable braking conditions of a commercial vehicle, the braking pressure is caused to change according to braking expectations without deviation. However, there is no scientific detection means to accurately detect and characterize actual changes. Therefore, it is urgent to solve the key technical problem, namely, how to detect a pressure change rate of a component in an electro-pneumatic braking system of a commercial vehicle.

SUMMARY

The technical problem to be solved in the present disclosure is to provide an apparatus and method for testing a pressure change rate of a component in an electro-pneumatic braking system of a commercial vehicle to address the problems of a pressure deviation and a time deviation in an existing electro-pneumatic braking system of a commercial vehicle. The key control parameter, namely, the pressure change rate, of the electro-pneumatic braking system of the commercial vehicle can be accurately measured. The problems of a pressure deviation and a time deviation between actual braking pressure response and desired braking pressure response in the electro-pneumatic braking system of the commercial vehicle can be solved.

To solve the above technical problem, the present disclosure adopts the following technical solutions:

An apparatus for testing a pressure change rate of an element in an electro-pneumatic braking system of a commercial vehicle includes:

a pressure change rate test bench including an insulating operating stand including a bench panel and an insulating rubber pad, and a special support disposed on the insulating operating stand to fix different components and assemblies;

a pneumatic loop mounted on the pressure change rate test bench through the special support, connected to the pressure change rate test bench through a pipeline or an elbow, and configured to implement on-off control of air and detection on a pressure change rate of a tested component in an electro-pneumatic braking system of a commercial vehicle;

a signal processing unit including a filter circuit and an NI acquisition card and configured to acquire a pressure signal and a differential pressure signal and perform analog-digital conversion on the signals to provide signals recognizable by an upper controller and a lower execution component; and a control unit configured to communicate with the pneumatic loop and drive the components in the pneumatic loop to act by setting a control parameter to obtain test data of the tested component in the electro-pneumatic braking system of the commercial vehicle in the pneumatic loop, where the test data includes braking pressure change rate information and pressure information of the tested component in the electro-pneumatic braking system of the commercial vehicle.

In the above technical solution, the pneumatic loop section may include an air source unit, a manually operated switching valve, an electric proportional valve, an anti-lock braking system (ABS) electromagnetic valve, an electric proportional valve, a brake chamber, a laminar drag pipe, a differential pressure sensor, an isothermal chamber, and a pressure sensor. The air source unit may include a pneumatic air compressor for supplying air to the pneumatic loop, a pneumatic triple for filtering out impurities and moisture in compressed air, and an air storage tank. The pneumatic triple is connected to an air outlet of the air compressor through a PA pipe. The manually operated switching valve is directly connected to an air inlet of the air storage tank through a PA pipe. The air storage tank is attached to an air outlet of the manually operated switching valve. The electric proportional valve is connected to an air outlet of the air storage tank through a PA pipe. The ABS electromagnetic valve is directly connected to an air outlet of the electric proportional valve. The brake chamber has three connection holes, one of which serves as an air inlet connected to the ABS electromagnetic valve through a PA pipe while the other two as air outlets directly connected to the laminar drag pipe and the differential pressure sensor, respectively. The laminar drag pipe is directly connected between the brake chamber and the isothermal chamber. The differential pressure sensor is directly connected between the brake chamber and the isothermal chamber.

In the above technical solution, the laminar drag pipe may include an external pipe, which is a PA pipe, and capillary tubes fully filling the external pipe and each having a same length with the external pipe to create laminar flow in the laminar drag pipe, causing a pressure at an air outlet of the laminar drag pipe to change later than a pressure at an air inlet so as to generate a pressure difference between the air inlet and the air outlet.

In the above technical solution, a constant temperature is maintained in the isothermal chamber for reducing errors caused by temperature change during testing. The isothermal chamber is flange-shaped and fixed to the pressure change rate test bench through an isothermal chamber support. The isothermal chamber has two flange faces. One flange face is provided with two holes that are connected to the laminar drag pipe and the differential pressure sensor, respectively, and the other flange face is provided with one hole for connection with the pressure sensor.

In the above technical solution, the differential pressure sensor may be configured to measure a pressure difference between the brake chamber and the isothermal chamber.

In the above technical solution, the filter circuit may be connected to signal lines of the NI acquisition card and the components in the pneumatic loop. The NI acquisition card is connected to the filter circuit and the control unit and configured to acquire and transmit signals in the pneumatic loop to the control unit and to receive and transmit a signal from the control unit to control the components in the pneumatic loop.

In the above technical solution, the filter circuit may be connected to the NI acquisition card and the signal lines of the ABS electromagnetic valve, the electric proportional valve, the differential pressure sensor and the pressure sensor. The NI acquisition card is connected to the filter circuit and the control unit. The signal line of the differential pressure sensor is connected to an A/D port of the NI acquisition card through the filter circuit, and the signal line of the pressure sensor is connected to the A/D port of the NI acquisition card through the filter circuit. The NI acquisition card acquires and transmits a signal from the pressure sensor. The signal line of the ABS electromagnetic valve is connected to a D/A port of the NI acquisition card through a relay, and the signal line of the electric proportional valve is connected to the D/A port of the NI acquisition card through the relay. The NI acquisition card receives and transmits a signal from the control unit; meanwhile, a digital port of the NI acquisition card outputs high and low levels to control the relay so as to control the ABS electromagnetic valve of the pneumatic loop. The NI acquisition card is programmed to output a corresponding analog voltage signal, and a voltage value and a pressure value are controlled to be proportional to each other, such that the pressure of an output port of the electric proportional valve can be obtained.

In the above technical solution, the control unit may include a controller and a receiver. The controller is an upper computer and configured to control the ABS electromagnetic valve and the electric proportional valve in the pneumatic loop section to act in real time and process test data obtained by the differential pressure sensor and the pressure sensor to obtain the braking pressure change rate of the tested component in the electro-pneumatic braking system of the commercial vehicle. The receiver is connected to the NI acquisition card and configured to receive and transmit the test data of the tested component in the electro-pneumatic braking system of the commercial vehicle to the controller.

A method for testing a pressure change rate of a component in an electro-pneumatic braking system of a commercial vehicle, which uses the apparatus for testing a pressure change rate of a component in an electro-pneumatic braking system of a commercial vehicle described above and includes the following steps:

inputting and transmitting the control parameter to the components in the pneumatic loop;

controlling the components in the pneumatic loop according to the control parameter to perform tests on the tested component in the electro-pneumatic braking system of the commercial vehicle according to the control parameter; and analyzing and processing the test data obtained during the tests to obtain the pressure change rate of the tested component in the electro-pneumatic braking system of the commercial vehicle.

In the above technical solution, testing the pressure change rate of the brake chamber may include the following steps:

before test running, draining condensed water at each position, and closing the manually operated switching valve such that an output pressure at each position is zero;

opening the air compressor to allow compressed air to enter the pneumatic triple, and filtering the compressed air to obtain clean compressed air; opening the manually operated switching valve to allow the clean compressed air to enter the air storage tank, and filling the air storage tank with the compressed air to ensure stable air pressure during testing; controlling the electric proportional valve by the upper computer such that an outlet pressure of the air storage tank reaches 0.7 MPa, then controlling the ABS electromagnetic valve by the upper computer, and acquiring pressure signals from the pressure sensor and the differential pressure sensor, thereby performing a pressure rise test, a pressure drop test and a pressure maintaining test on the brake chamber separately.

The pressure rise test is as follows: the upper computer gives a control signal to control both of an electromagnetic intake valve and an electromagnetic vent valve of the ABS electromagnetic valve to be shut off, and the air inlet and the air outlet of the ABS electromagnetic valve are communicated with each other at this time, allowing air to fill the brake chamber. Accordingly, the pressure in the brake chamber rises until it becomes stable. In this process, real-time pressure of the isothermal chamber measured by the pressure sensor and the pressure signal of the differential pressure sensor are acquired by the NI acquisition card and transmitted to the upper computer for processing by the upper computer to obtain real-time data and an image of the pressure change rate of the brake chamber in the air filling process.

The pressure drop test is as follows: the upper computer gives a control signal to control both of the electromagnetic intake valve and the electromagnetic vent valve of the ABS electromagnetic valve to be electrified such that the air inlet of the ABS electromagnetic valve is sealed while the air outlet is communicated with a vent port, allowing the brake chamber to vent air. Accordingly, the pressure in the brake chamber drops until it becomes stable. In this process, the real-time pressure of the isothermal chamber measured by the pressure sensor and the pressure signal of the differential pressure sensor are acquired by the NI acquisition card and transmitted to the upper computer for processing by the upper computer to obtain the real-time data and an image of the pressure change rate of the brake chamber in the air venting process.

The pressure maintaining test is as follows: the upper computer gives a control signal to control the electromagnetic intake valve of the ABS electromagnetic valve to be electrified and the electromagnetic vent valve to be shut off such that both of the air inlet and the air outlet of the ABS electromagnetic valve are sealed, throwing the brake chamber into a pressure maintaining state. In this process, the real-time pressure of the isothermal chamber measured by the pressure sensor and the pressure signal of the differential pressure sensor are acquired by the NI acquisition card and transmitted to the upper computer for processing by the upper computer to obtain the real-time data and an image of the pressure change rate of the brake chamber in the pressure maintaining process.

The apparatus and method for testing a pressure change rate of a component in an electro-pneumatic braking system of a commercial vehicle provided in the present disclosure have the following advantages: to reduce errors of a mathematic model, the testing environment is closer to the real running environment. Physical devices are combined with simulation, and the pressure change rate test bench, the pneumatic loop, the signal processing unit and the control unit are integrated. The main components of the pneumatic loop are all mounted on the pressure change rate test bench through customized supports and connected with one another through parts such as PA pipes and elbows for on-off control on air and detection on the pressure change rate of the tested component in the electro-pneumatic braking system of the commercial vehicle. The control unit drives the components in the pneumatic loop to act by inputting the control parameter to obtain the test data of the tested component in the electro-pneumatic braking system of the commercial vehicle, and controls the pneumatic loop to perform tests according to the control parameter. The test data includes braking pressure change rate information and pressure information of the tested component in the electro-pneumatic braking system of the commercial vehicle, and the obtained real-time test result of the pressure change rate of the component in the electro-pneumatic braking system of the commercial vehicle is more accurate and real. The problems of a pressure deviation and a time deviation between actual braking pressure response and desired braking pressure response in the electro-pneumatic braking system of the commercial vehicle can be solved.

Figure 1:
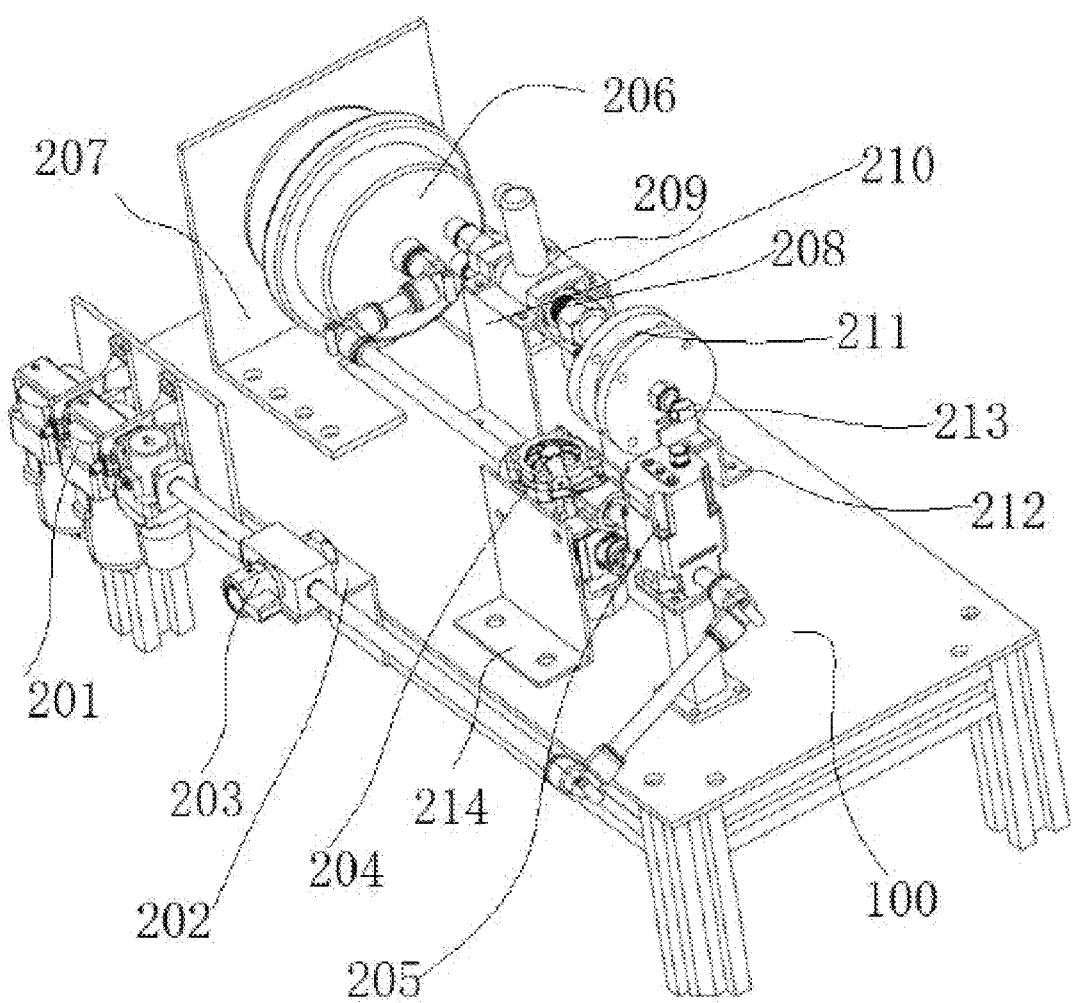
FIG. 1 is a three-dimensional structural schematic diagram of an apparatus for testing a pressure change rate of a component in an electro-pneumatic braking system of a commercial vehicle according to the present disclosure.

List of Reference Numerals: 201—air source unit, 202—manually operated switching valve support, 203—manually operated switching valve, 204—ABS electromagnetic valve, 205—electric proportional valve, 206—brake chamber, 207—brake chamber support, 208—laminar drag pipe, 209—differential pressure sensor, 210—differential pressure sensor support, 211—isothermal chamber, 212—isothermal chamber support, 213—pressure sensor, 214—ABS electromagnetic valve support, 401—air compressor, 402—pneumatic triple, 403—air storage tank, 404—NI acquisition card, and 405—upper computer.

DETAILED DESCRIPTION OF THE EMBODIMENTS

To make the objectives, technical solutions and advantages of the present disclosure clearer and more understandable, the present disclosure will be further described in detail below in conjunction with the accompanying drawings and embodiments. The following descriptions of different exemplary embodiments are merely illustrative and not meant to limit the present disclosure. Unless otherwise specified, the relative arrangements, expressions and numerical values of assemblies and steps in the exemplary embodiments do not limit the scopes of the present disclosure.

As shown in FIG. 1, an apparatus for testing a pressure change rate of a component in an electro-pneumatic braking system of a commercial vehicle includes a pressure change rate test bench 100, a pneumatic loop section, a signal processing unit, a data processing section and a control unit section.

Figure 2:
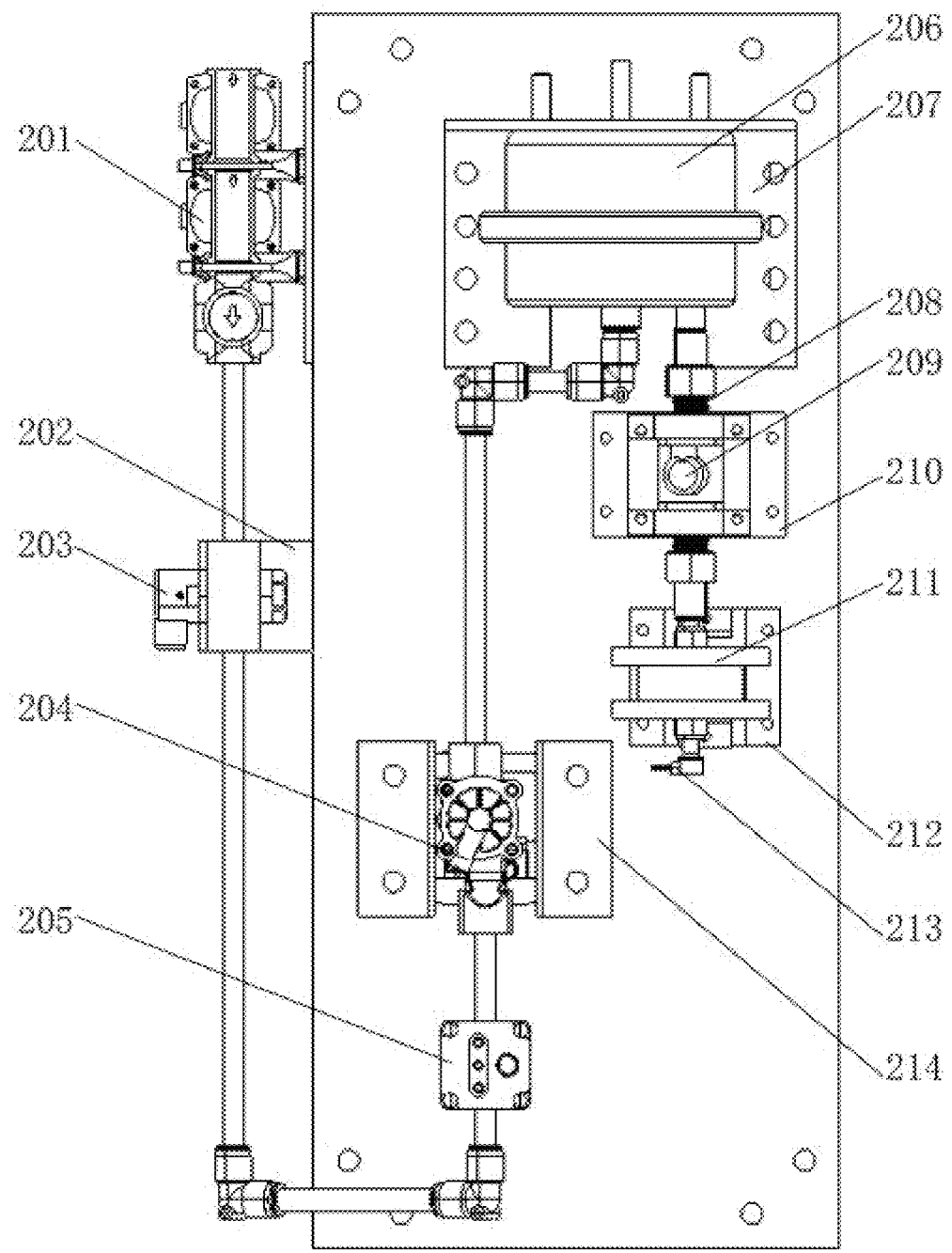
FIG. 2 is a diagram (illustrating the structure of a pneumatic loop section) of an apparatus for testing a pressure change rate of a component in an electro-pneumatic braking system of a commercial vehicle according to the present disclosure.
Figure 4:
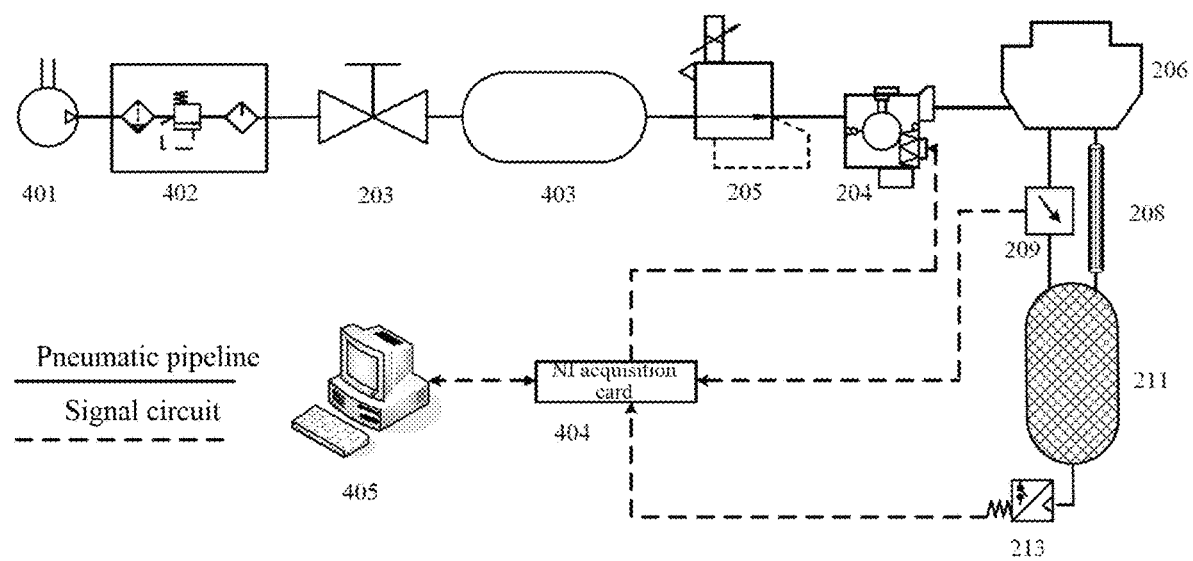
FIG. 4 is a schematic diagram illustrating an overall framework of an apparatus for testing a pressure change rate of a component in an electro-pneumatic braking system of a commercial vehicle according to the present disclosure.

FIG. 2 and FIG. 4 are a structural arrangement diagram and a structural schematic diagram of the apparatus for testing a pressure change rate of a component in an electro-pneumatic braking system of a commercial vehicle according to the present disclosure.

The pressure change rate test bench includes an insulating operating stand and a special support.

The insulating operating stand includes a bench panel 100, and an insulating rubber pad which is made of rubber to ensure the electrical safety when testing the pressure change rate. The bench panel 100 is made of 304 stainless steel and configured to mount the special support. The component to be tested of the electrically controlled air braking system of the commercial vehicle is tested in the insulating operating stand.

The special support includes a manually operated switching valve support 202, a brake chamber support 207, a differential pressure sensor support 210, an isothermal chamber support 212, and an anti-lock braking system (ABS) electromagnetic valve support 214. All such supports are made of 304 stainless steel, configured to fix components of the testing apparatus, and fastened to the hanging bench panel 100 by bolts, thereby ensuring that the pneumatic loop is at the same level and ensuring the smoothness of the pneumatic loop.

Apart from the above-mentioned special support, other components are attached to or around the bench panel 100 by using frame structures such as aluminum alloy profiles or special triangular connecting pieces for profiles. The frame structures are all made of aluminum alloy and fastened by bolts to form a simple and compact overall structure for mounting the special support, the insulating operating stand and the components of the testing apparatus. Thus, the apparatus for testing a pressure change rate of a component in an electro-pneumatic braking system of a commercial vehicle has clear appearance and regularly arranged pipeline, and allows for higher reliability of experimental results. Such a design is conducive to clear appearance and regular pipeline arrangement of the apparatus for testing a pressure change rate of a component in an electro-pneumatic braking system of a commercial vehicle, and higher reliability of experimental results.

As shown in FIG. 1, FIG. 2 and FIG. 4, the pneumatic loop section includes an air source unit 201, a manually operated switching valve 203, an electric proportional valve 205, an ABS electromagnetic valve 204, an electric proportional valve 205, a brake chamber 206, a laminar drag pipe 208, a differential pressure sensor 209, an isothermal chamber 211, and a pressure sensor 213. The air source unit 201 includes a pneumatic air compressor 401, a pneumatic triple 402 (an assembly of three air source treatment components, namely, an air filter, a regulator and an lubricator), and an air storage tank 403. The air compressor 401 supplies air to the pneumatic loop and is capable of stably supplying an air pressure of 1 Mpa. The pneumatic triple 402 is connected to an air outlet of the air compressor 401 through a PA pipe and mainly serves to filter out impurities and moisture in compressed air. As the air supply main switch of the whole testing apparatus, the manually operated switching valve 203 is directly connected to an air inlet of the air storage tank 403 through a PA pipe and fixed to the pressure change rate test bench through the manually operated switching valve support 202. The air storage tank 403 is attached to an air outlet of the manually operated switching valve 203 and serves to store air, stabilize the air pressure in the testing process and ensure stable pressure of the pneumatic loop. The electric proportional valve 205 is connected to an air outlet of the air storage tank 403 through a PA pipe. The electric proportional valve 205 is high in pressure regulation accuracy and electronically controllable, which is conducive to directly regulating the air pressure of the test loop through an upper computer, thereby ensuring accurate pressure in the pneumatic loop. The ABS electromagnetic valve 204 is directly connected to an air outlet of the electric proportional valve and fixed to the pressure change rate test bench through the ABS electromagnetic valve support 214. The ABS electromagnetic valve functions to change the pressure of the test loop. The ABS electromagnetic valve is electronically controlled and thus can be directly controlled through the upper computer. The brake chamber 206 is fixed to the pressure change rate test bench through the brake chamber support 207. The brake chamber 206 has three connection holes, one of which serves as an air inlet connected to the ABS electromagnetic valve through a PA pipe while the other two as air outlets directly connected to the laminar drag pipe 208 and the differential pressure sensor 209, respectively. The brake chamber 206 may be replaced by other tested component. This embodiment is just described with the brake chamber as an example.

The laminar drag pipe 208 is directly connected between the brake chamber 206 and the isothermal chamber 211 and includes an external pipe (which is a PA pipe) and capillary tubes fully filling the external pipe and each having a same length with the external pipe to create laminar flow in the laminar drag pipe 208. In this manner, the pressure at the air outlet of the laminar drag pipe 208 may change later than the pressure at the air inlet and a pressure difference may be formed between the air inlet and the air outlet. A constant temperature is maintained in the isothermal chamber 211, which is conducive to reducing errors caused by temperature change during testing.

The differential pressure sensor 209 is directly connected between the brake chamber 206 and the isothermal chamber 211 and configured to measure the pressure difference between the brake chamber 206 and the isothermal chamber 211. The isothermal chamber 211 is flange-shaped and fixed to the pressure change rate test bench through the isothermal chamber support 212. The isothermal chamber 211 has three holes, including two holes formed in one flange face and connected to the laminar drag pipe 208 and the differential pressure sensor 209, respectively, and one hole formed in the other face for connection with the pressure sensor 213. A constant temperature is maintained in the isothermal chamber 211, which is conducive to reducing errors caused by temperature change during testing. The pressure sensor 213 is connected to the isothermal chamber and configured to measure the pressure of the isothermal chamber.

Figure 3:
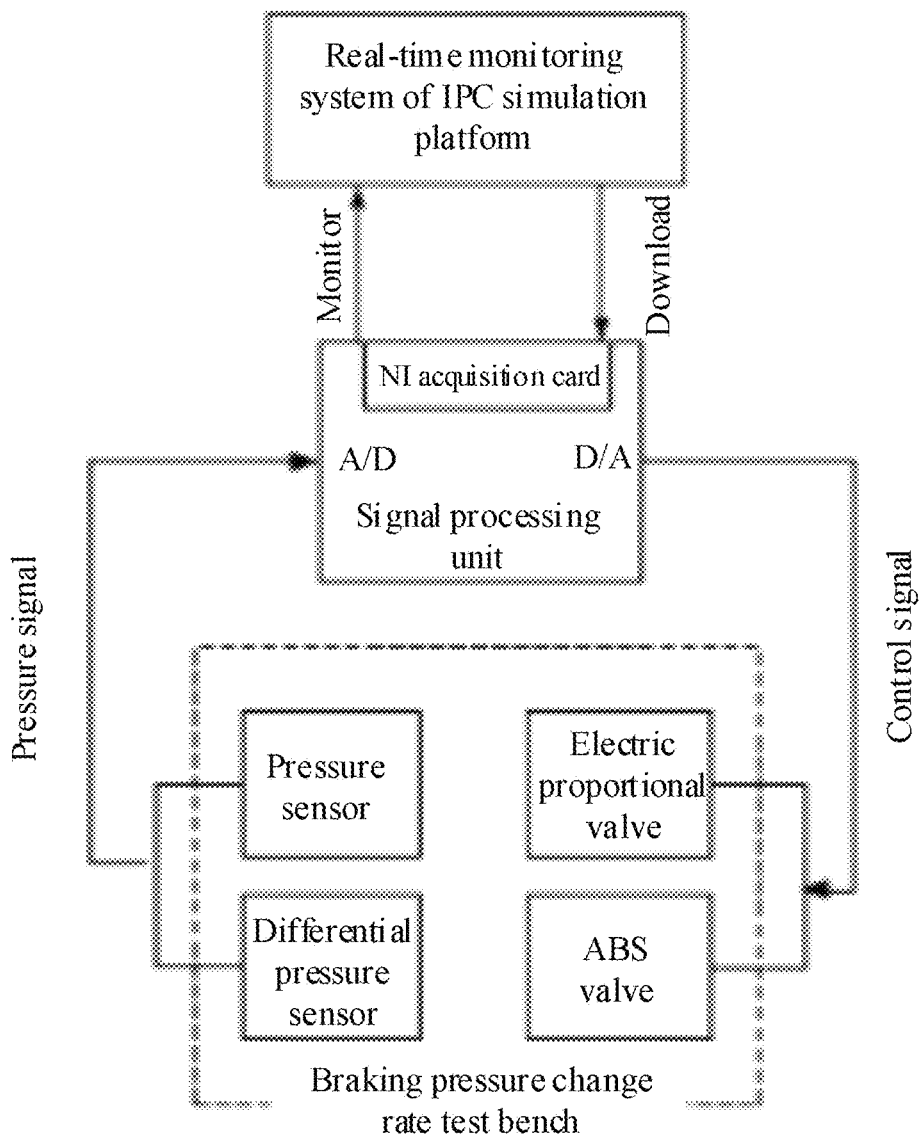
FIG. 3 is a control schematic diagram according to the present disclosure.

FIG. 3 is a schematic diagram of a control system according to the present disclosure. The control system includes a signal processing unit, a data processing section, and a control unit.

The signal processing unit includes a filter circuit and an NI acquisition card. The filter circuit is connected to signal lines of the NI acquisition card 404, the ABS electromagnetic valve 204, the electric proportional valve 205, the differential pressure sensor 209 and the pressure sensor 213 such that smooth signals can be obtained. The NI acquisition card is connected to the filter circuit and the control unit. The signal line of the differential pressure sensor 209 is connected to an A/D port of the NI acquisition card 404 through the filter circuit, and the signal line of the pressure sensor 213 is connected to the A/D port of the NI acquisition card 404 through the filter circuit. The NI acquisition card 404 acquires and transmits the signals to the control unit. The signal line of the ABS electromagnetic valve 204 is connected to a D/A port of the NI acquisition card 404 through a relay, and the signal line of the electric proportional valve 205 is connected to the D/A port of the NI acquisition card 404 through the relay. The NI acquisition card 404 receives and transmits a signal from the control unit. Meanwhile, a digital port of the NI acquisition card 404 outputs high and low levels to control the relay so as to control the ABS electromagnetic valve 204 of the pneumatic loop. The NI acquisition card 404 is programmed to output a corresponding analog voltage signal, and a voltage value and a pressure value are controlled to be proportional to each other, such that the pressure of an output port of the electric proportional valve 205 can be obtained.

The control unit includes a controller and a receiver. The controller is an upper computer and configured to control the ABS electromagnetic valve 204 and the electric proportional valve 205 in the pneumatic loop section to act in real time and process test data obtained by the differential pressure sensor 209 and the pressure sensor 213 to obtain the braking pressure change rate of the tested component in the electro-pneumatic braking system of the commercial vehicle. The receiver is connected to the NI acquisition card 404 and configured to receive and transmit the test data of the tested component in the electro-pneumatic braking system of the commercial vehicle to the controller.

With reference to FIG. 4 which is the structural schematic diagram according to the present disclosure, the working process of the apparatus for testing a pressure change rate of a component in an electro-pneumatic braking system of a commercial vehicle is as follows.

Before test running, condensed water at each position is drained. The manually operated switching valve 203 or a stop valve should be closed. The output pressure at each position should be zero. A throttling valve of the lubricator in the manually operated switching valve 203 should be fully closed.

The test of the pressure change rate is now described with the brake chamber 206 as the test object. The air compressor 401 is opened to allow compressed air to enter the pneumatic triple 402, whereby the compressed air is filtered to obtain clean compressed air. The manually operated switching valve 203 is opened to allow the clean compressed air to enter the air storage tank 403. The compressed air fills the air storage tank 403 to ensure stable air pressure during testing. The electric proportional valve 205 is controlled by the upper computer 405 such that the outlet pressure of the air storage tank 403 reaches 0.7 MPa. The ABS electromagnetic valve 204 is then controlled by the upper computer 405, and pressure signals from the pressure sensor 213 and the differential pressure sensor 209 are acquired. Thus, a pressure rise test, a pressure drop test and a pressure maintaining test are performed on the brake chamber 206 separately.

The pressure rise test is as follows: the upper computer 405 gives a control signal to control both of an electromagnetic intake valve and an electromagnetic vent valve of the ABS electromagnetic valve 204 to be shut off, and the air inlet and the air outlet of the ABS electromagnetic valve 204 are communicated with each other at this time, allowing air to fill the brake chamber. Accordingly, the pressure in the brake chamber rises until it becomes stable. In this process, the real-time pressure of the isothermal chamber 211 measured by the pressure sensor 213 and the pressure signal of the differential pressure sensor 209 are acquired by the NI acquisition card 404 and transmitted to the upper computer 405 for processing by a program to obtain the real-time data and an image of the pressure change rate of the brake chamber 206 in the air filling process.

The pressure drop test is as follows: the upper computer 405 gives a control signal to control both of the electromagnetic intake valve and the electromagnetic vent valve of the ABS electromagnetic valve 204 to be electrified such that the air inlet of the ABS electromagnetic valve 204 is sealed while the air outlet is communicated with a vent port, allowing the brake chamber to vent air. Accordingly, the pressure in the brake chamber drops until it becomes stable. In this process, the real-time pressure of the isothermal chamber 211 measured by the pressure sensor 213 and the pressure signal of the differential pressure sensor 209 are acquired by the NI acquisition card 404 and transmitted to the upper computer 405 for processing by the program to obtain the real-time data and an image of the pressure change rate of the brake chamber 206 in the air venting process.

The pressure maintaining test is as follows: the upper computer 405 gives a control signal to control the electromagnetic intake valve of the ABS electromagnetic valve 204 to be electrified and the electromagnetic vent valve to be shut off such that both of the air inlet and the air outlet of the ABS electromagnetic valve 204 are sealed, throwing the brake chamber into a pressure maintaining state. In this process, the real-time pressure of the isothermal chamber 211 measured by the pressure sensor 213 and the pressure signal of the differential pressure sensor 209 are acquired by the NI acquisition card 404 and transmitted to the upper computer 405 for processing by the program to obtain the real-time data and an image of the pressure change rate of the brake chamber 206 in the pressure maintaining process.

The foregoing are merely descriptions of the preferred embodiments of the present disclosure and not intended to limit the present disclosure in any form. Other variations and modifications may be made without going beyond the technical solutions set forth in claims. Replacements and changes made be made to technical features by those skilled in the art without creative efforts, and these replacements and changes shall all fall within the protection scope of the present disclosure.

What is claimed is:

1. An apparatus for testing a pressure change rate of a component in an electro-pneumatic braking system of a commercial vehicle, comprising:
    a pressure change rate test bench comprising an insulating operating stand including a bench panel and an insulating rubber pad, and a special support disposed on the insulating operating stand to fix different components and assemblies;
    a pneumatic loop mounted on the pressure change rate test bench through the special support, and configured to implement on-off control of air and detection on a pressure change rate of a tested component in an electro-pneumatic braking system of a commercial vehicle;
    a signal processing unit comprising a filter circuit and a National Instruments (NI) acquisition card and configured to acquire a pressure signal and a differential pressure signal and perform analog-digital conversion on the signals to provide signals recognizable by an upper controller and a lower execution component; and
    a control unit configured to communicate with the pneumatic loop and drive the components in the pneumatic loop to act by setting a control parameter to obtain test data of the tested component in the electro-pneumatic braking system of the commercial vehicle in the pneumatic loop, wherein the test data comprises braking pressure change rate information and pressure information of the tested component in the electro-pneumatic braking system of the commercial vehicle.

2. The apparatus according to claim 1, wherein the pneumatic loop section comprises an air source unit, a manually operated switching valve, an electric proportional valve, an anti-lock braking system (ABS) electromagnetic valve, a brake chamber, a laminar drag pipe, a differential pressure sensor, an isothermal chamber, and a pressure sensor;
    the air source unit comprises a pneumatic air compressor for supplying air to the pneumatic loop, a pneumatic triple for filtering out impurities and moisture in compressed air, and an air storage tank; the pneumatic triple is connected to an air outlet of the air compressor through a polyamide (PA) pipe; the manually operated switching valve is directly connected to an air inlet of the air storage tank through a PA pipe; the air storage tank is attached to an air outlet of the manually operated switching valve; the electric proportional valve is connected to an air outlet of the air storage tank through a PA pipe; the ABS electromagnetic valve is directly connected to an air outlet of the electric proportional valve; the brake chamber has three connection holes, one of which serves as an air inlet connected to the ABS electromagnetic valve through a PA pipe while the other two as air outlets directly connected to the laminar drag pipe and the differential pressure sensor, respectively; the laminar drag pipe is directly connected between the brake chamber and the isothermal chamber; and the differential pressure sensor is directly connected between the brake chamber and the isothermal chamber.

3. The apparatus according to claim 2, wherein the laminar drag pipe comprises an external pipe, which is a PA pipe, and capillary tubes fully filling the external pipe and each having a same length with the external pipe to create laminar flow in the laminar drag pipe, causing a pressure at an air outlet of the laminar drag pipe to change later than a pressure at an air inlet so as to generate a pressure difference between the air inlet and the air outlet.

4. The apparatus according to claim 2, wherein a constant temperature is maintained in the isothermal chamber for reducing errors caused by temperature change during testing; the isothermal chamber is flange-shaped and fixed to the pressure change rate test bench through an isothermal chamber support; the isothermal chamber has two flange faces; one flange face is provided with two holes that are connected to the laminar drag pipe and the differential pressure sensor, respectively, and the other flange face is provided with one hole for connection with the pressure sensor.

5. The apparatus according to claim 2, wherein the differential pressure sensor is configured to measure a pressure difference between the brake chamber and the isothermal chamber.

6. The apparatus according to claim 1, wherein the filter circuit is connected to the NI acquisition card and signal lines of the components in the pneumatic loop; and the NI acquisition card is connected to the filter circuit and the control unit and configured to acquire and transmit signals in the pneumatic loop to the control unit and to receive and transmit a signal from the control unit to control the components in the pneumatic loop.

7. The apparatus according to claim 6, wherein the filter circuit is connected to the NI acquisition card and the signal lines of the ABS electromagnetic valve, the electric proportional valve, the differential pressure sensor and the pressure sensor; the NI acquisition card is connected to the filter circuit and the control unit; the signal line of the differential pressure sensor is connected to an A/D port of the NI acquisition card through the filter circuit, and the signal line of the pressure sensor is connected to the A/D port of the NI acquisition card through the filter circuit; the NI acquisition card acquires and transmits a signal from the pressure sensor; the signal line of the ABS electromagnetic valve is connected to a D/A port of the NI acquisition card through a relay, and the signal line of the electric proportional valve is connected to the D/A port of the NI acquisition card through the relay; the NI acquisition card receives and transmits a signal from the control unit; meanwhile, a digital port of the NI acquisition card outputs high and low levels to control the relay so as to control the ABS electromagnetic valve of the pneumatic loop; the NI acquisition card is programmed to output a corresponding analog voltage signal, and a voltage value and a pressure value are controlled to be proportional to each other, such that the pressure of an output port of the electric proportional valve can be obtained.

8. The apparatus according to claim 1, wherein the control unit comprises a controller and a receiver; the controller is an upper computer and configured to control the ABS electromagnetic valve and the electric proportional valve in the pneumatic loop section to act in real time and process test data obtained by the differential pressure sensor and the pressure sensor to obtain the braking pressure change rate of the tested component in the electro-pneumatic braking system of the commercial vehicle; and the receiver is connected to the NI acquisition card and configured to receive and transmit the test data of the tested component in the electro-pneumatic braking system of the commercial vehicle to the controller.

9. A method for testing a pressure change rate of a component in an electro-pneumatic braking system of a commercial vehicle, using the apparatus for testing a pressure change rate of a component in an electro-pneumatic braking system of a commercial vehicle according to claim 1, the method comprising the following steps:
  inputting and transmitting the control parameter to the components in the pneumatic loop;
  controlling the components in the pneumatic loop according to the control parameter to perform tests on the tested component in the electro-pneumatic braking system of the commercial vehicle according to the control parameter; and
  analyzing and processing the test data obtained during the tests to obtain the pressure change rate of the tested component in the electro-pneumatic braking system of the commercial vehicle.

10. The method according to claim 9, wherein testing the pressure change rate of the brake chamber comprises the following steps:
  before test running, draining condensed water at each position, and closing the manually operated switching valve such that an output pressure at each position is zero;
  opening the air compressor to allow compressed air to enter the pneumatic triple, and filtering the compressed air to obtain clean compressed air; opening the manually operated switching valve to allow the clean compressed air to enter the air storage tank, and filling the air storage tank with the compressed air to ensure stable air pressure during testing; controlling the electric proportional valve by the upper computer such that an outlet pressure of the air storage tank reaches 0.7 MPa, then controlling the ABS electromagnetic valve by the upper computer, and acquiring pressure signals from the pressure sensor and the differential pressure sensor, thereby performing a pressure rise test, a pressure drop test and a pressure maintaining test on the brake chamber separately;
  wherein the pressure rise test is as follows: the upper computer gives a control signal to control both of an electromagnetic intake valve and an electromagnetic vent valve of the ABS electromagnetic valve to be shut off, and the air inlet and the air outlet of the ABS electromagnetic valve are communicated with each other at this time, allowing air to fill the brake chamber; accordingly, the pressure in the brake chamber rises until it becomes stable; in this process, real-time pressure of the isothermal chamber measured by the pressure sensor and the pressure signal of the differential pressure sensor are acquired by the NI acquisition card and transmitted to the upper computer for processing by the upper computer to obtain real-time data and an image of the pressure change rate of the brake chamber in the air filling process;
  the pressure drop test is as follows: the upper computer gives a control signal to control both of the electromagnetic intake valve and the electromagnetic vent valve of the ABS electromagnetic valve to be electrified such that the air inlet of the ABS electromagnetic valve is sealed while the air outlet is communicated with a vent port, allowing the brake chamber to vent air; accordingly, the pressure in the brake chamber drops until it becomes stable; in this process, the real-time pressure of the isothermal chamber measured by the pressure sensor and the pressure signal of the differential pressure sensor are acquired by the NI acquisition card and transmitted to the upper computer for processing by the upper computer to obtain the real-time data and an image of the pressure change rate of the brake chamber in the air venting process;

the pressure maintaining test is as follows: the upper computer gives a control signal to control the electromagnetic intake valve of the ABS electromagnetic valve to be electrified and the electromagnetic vent valve to be shut off such that both of the air inlet and the air outlet of the ABS electromagnetic valve are sealed, throwing the brake chamber into a pressure maintaining state; in this process, the real-time pressure of the isothermal chamber measured by the pressure sensor and the pressure signal of the differential pressure sensor are acquired by the NI acquisition card and transmitted to the upper computer for processing by the upper computer to obtain the real-time data and an image of the pressure change rate of the brake chamber in the pressure maintaining process.

\* \* \* \* \*